United States Patent [19]

Rogers et al.

[11] 4,406,568
[45] Sep. 27, 1983

[54] PRECISION TOOL

[75] Inventors: William C. Rogers, Azle; William E. Davis, Jr., Itasca, both of Tex.

[73] Assignee: General Dynamics Corporation, Fort Worth, Tex.

[21] Appl. No.: 279,640

[22] Filed: Jul. 2, 1981

[51] Int. Cl.³ .......................... B23C 1/20; B27C 5/10
[52] U.S. Cl. .............................. 409/182; 144/134 D; 144/136 C; 409/180
[58] Field of Search ...................... 409/181, 182, 180; 144/134 R, 134 C, 134 D, 136 R, 136 C, 137

[56] References Cited

U.S. PATENT DOCUMENTS

| 2,702,569 | 2/1955 | Yelle | 144/134 D |
| 2,729,437 | 1/1956 | Brenner | 144/136 C |
| 2,837,973 | 6/1958 | Dunlap | 409/180 |
| 2,933,021 | 4/1960 | Kennedy et al. | 409/180 |
| 3,499,365 | 3/1970 | Needham | 409/182 X |
| 3,853,160 | 12/1974 | Posey | 144/137 |
| 3,893,372 | 7/1975 | Stakeljahar | 144/134 D X |
| 4,108,225 | 8/1978 | Hesticy | 409/182 X |
| 4,290,464 | 9/1981 | Marsan | 409/182 X |

Primary Examiner—William R. Briggs
Attorney, Agent, or Firm—James C. Fails; Charles E. Schurman

[57] ABSTRACT

A device for full depth hand routing characterized by a two piece base including a foot block and an attachment block, the attachment block being held to the foot block by a connector bolt and two adjusting screws to enable attaining parallel planes for a tool in the base of the block; a cantilevered holder extending from the attachment block; a tool on a shaft that is powered by a motor within a housing that has a substantially cylindrical barrel and a protruding threaded male part threaded engaging a threaded aperture on the cantilevered holder; an indicator scale around the base of the barrel and above the threads; and indicator carried by the attachment block and extending upwardly adjacent the depth scale such that accurate depth positions can be attained for routing to a desired depth. In a preferred embodiment, the cantilevered holder comprises a ring that allows 270° visibility about the routing tool. Also in the preferred embodiment, the foot block has an upstanding flange at 90° and the attachment block is held cantilevered from the upstanding flange by the connector bolt in a slot. The base block has rounded sides for traversing an irregularly shaped object such as an aircraft wing for attaining full depth routing.

13 Claims, 4 Drawing Figures

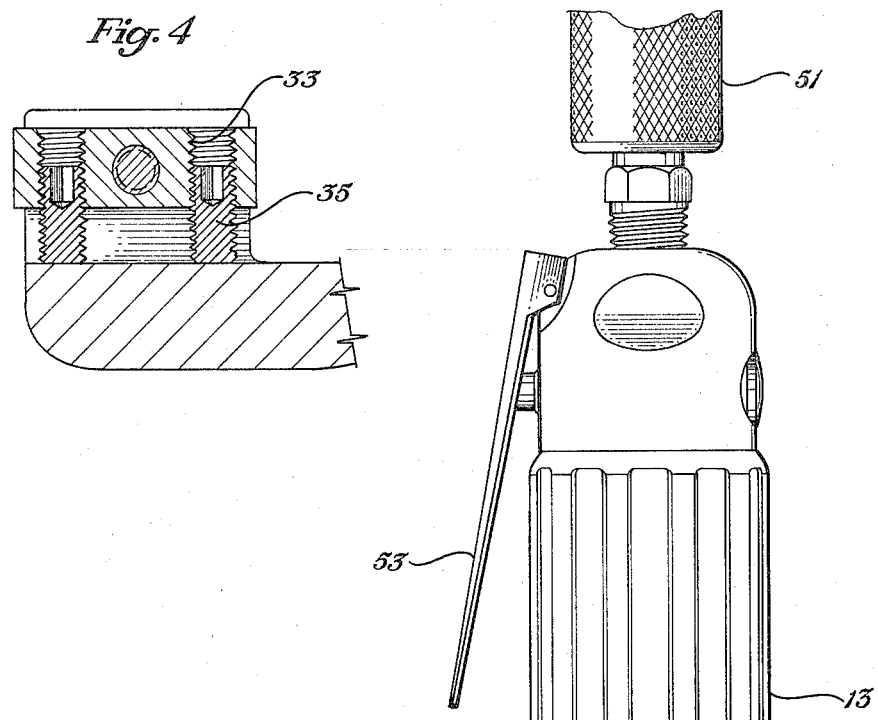
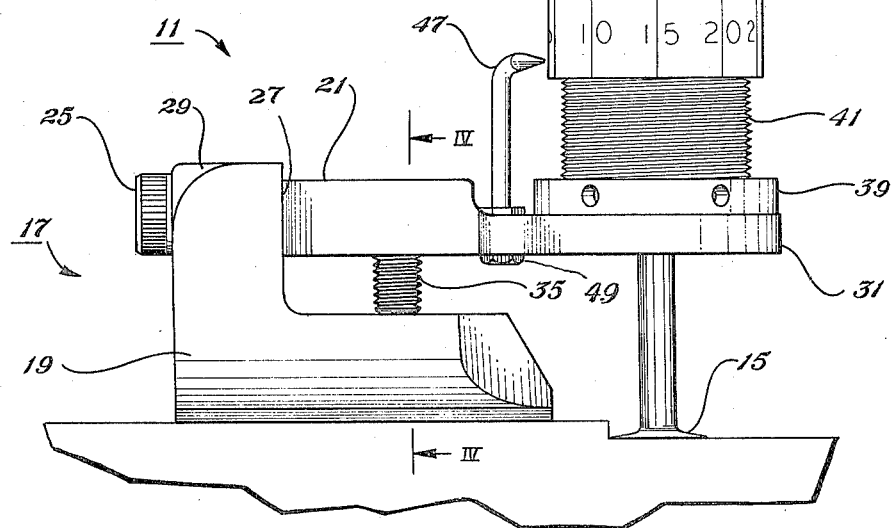

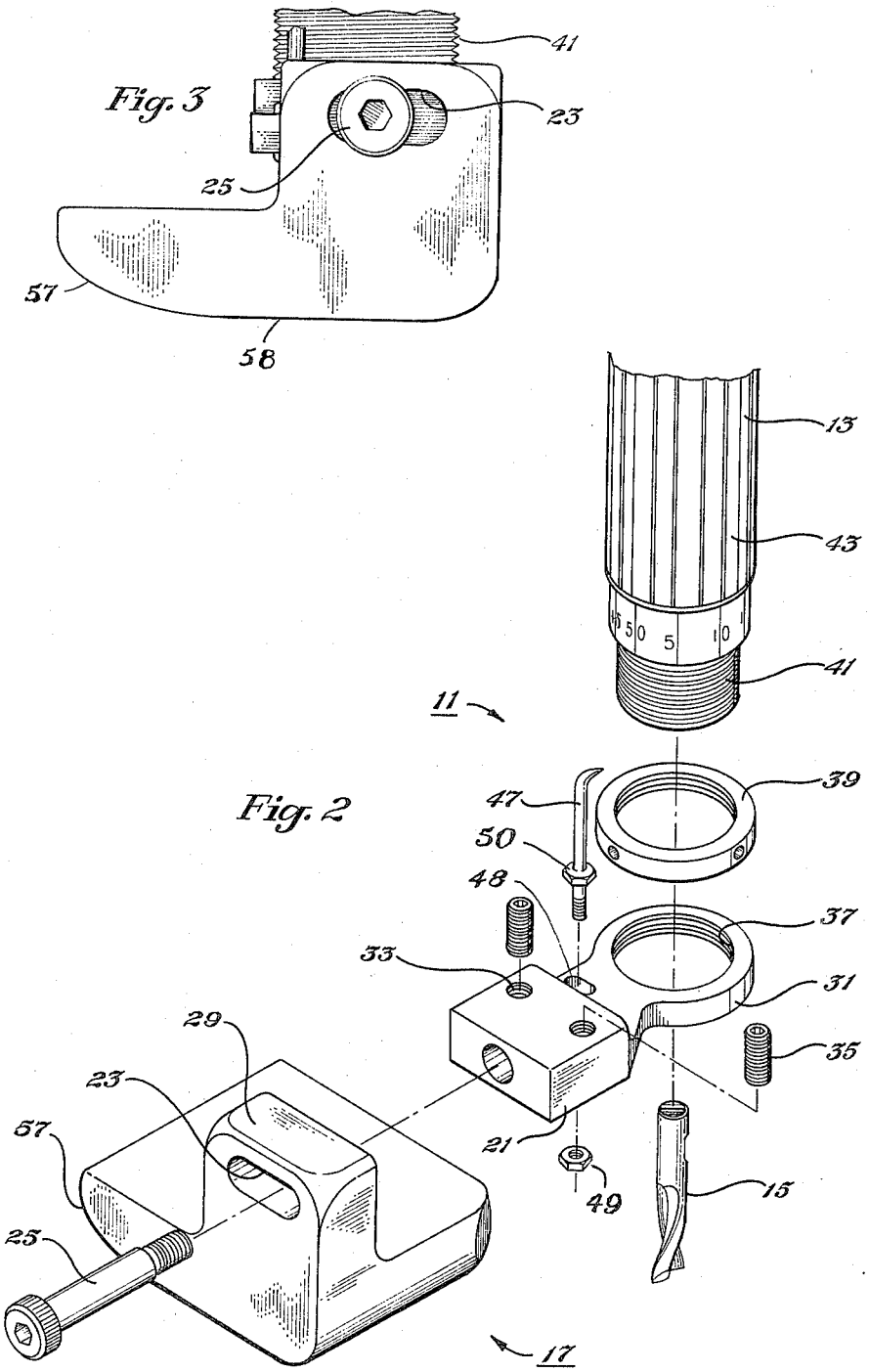

PRECISION TOOL

The government has rights in this invention pursuant to contract No. F33657-75-C-0310 awarded by the Department of the Air Force.

FIELD OF THE INVENTION

This invention relates to a portable device for routing and recessing and the like. More particularly, this invention relates to a hand held device for full depth hand routing of a structure such as an aircraft wing or the like.

DESCRIPTION OF THE PRIOR ART

The prior art has seen the development of a wide variety of precision tools such as routers, trimmers, rabbeting and processing tools and the like for routing substances such as wood, steel and the like. Typical of the developments in the prior art are those shown in the following United States Patents. U.S. Pat. No. 1,532,683 shows the combined morticing and shaping machine that has a complex extending screw for pivoting on a bolt for morticing and shaping wood or the like. U.S. Pat. No. 2,591,002 shows a router to cut out imperfections such as knots in the outside layers of laminated plywood prior to the insertion of pre-cut wooden plugs. The router slides upon parallel, horizontal rails or the like. U.S. Pat. No. 2,702,569 shows a defect remover and pocket router for removing defects in surface plys of plywood panels or the like. This surface router can be inclined at an angle and moved along parallel, horizontal rails for the desired removing. U.S. Pat. No. 2,726,690 shows a contour guide for routers. U.S. Pat. No. 2,756,785 shows a router for trimming veneers, decorative laminates, hard plastic surfacings and the like to produce a beveled edge. It employs a pair of handles on each side with an encompassing base that surrounds and obstructs vision except through the center. U.S. Pat. No. 2,839,107 shows a combination straight and bevel cutter for finishing the edge of a workpiece perpendicular to the surface thereof. It also employs an encompassing base with hand holdings on the side. U.S. Pat. No. 2,988,119 shows a depth gauge for motor operated hand tool. It also employs hand grips on the sides and an encompassing base with an electric motor. The depth gauge is engrafted onto one side and involves fairly complicated, multiple piece slide and indicator positioning. It does not have the accuracy needed for precision hand routing such as on aircraft wings or the like. U.S. Pat. No. 3,087,520 shows a portable rabbeting and recessing tool having an encompassing base and employing a tool on an electric drill or the like. U.S. Pat. No. 3,494,394 shows an electrically powered trimmer having a work piece engaging base rotatably journaling an arbor pit. A bit capable of making flush and bevelled cuts is attached to the arbor and extends through the base adjacent one end. U.S. Pat. No. 3,853,160 shows a router for cutting a step or wedge in the edge of a work piece and includes downwardly extending member with a pointed guide bar. The downwardly extending member controls the depth of shelves or the like that are routed into the side.

From the foregoing it can be seen that the prior art has not provided a device that allows matching the plane of the base to that of the plane of the routing of the tool, that allows quickly and accurately setting the depth of the tool below a base by viewing the position of an indicator rod opposite a depth scale. More particularly, it can be seen that the prior art has not provided a device that has a base block comprising two parts with an upper cantilevered holder holding a router tool threaded end that can be screwed to obtain an accurate depth and then locked into the desired depth and have approximately 270° clear viewing area around the tool with the upwardly arcuately curved sides of a base block to enable moving it along an irregularly shaped surface.

SUMMARY OF THE INVENTION

Accordingly, it is an object of this invention to provide a device such as a router, for accurate full depth hand routing of a structure, such as an aircraft wing, that allows matching the plane of the base to the plane of the routing of the tool and that allows quickly and accurately setting and attaining a desired depth for the tool below the base by viewing the position of an indicator rod opposite a depth scale.

It is a specific object of this invention to provide a device for full depth hand routing that enables approximately 270° clear viewing area around the tool with curved sides of a base block to enable moving it along an irregularly shaped surface.

These and other objects will become apparent from the invention when taken in conjunction with the descriptive matter hereinafter, particularly the enclosed drawings.

In accordance with this invention there is provided a device for full depth hand routing of a structure, such as an aircraft wing, comprising a two piece base including a foot block and an attachment block carrying a powered routing tool having a housing that screws longitudinally within a holder on the attachment block to get the desired depth. The housing has a substantially cylindrical barrel adjacent its bottom end with a threaded male protrusion threadedly engaging a threaded aperture on the cantilevered holder such that an upwardly protruding indicator indicates on a calibrated scale the depth to which the tool has been lowered by being screwed into the holder.

An adjusting means interconnects the foot block and the attachment block in such a way that the plane formed by a routing tool, or similar tool, is parallel with the bottom of the foot block. Any embodiment that will enable paralleling the planes can be employed.

In one embodiment, the foot block has a base and an upstanding flange to which the attachment block is cantilevered by way of a connector bolt. The attachment block has a pair of threaded apertures with adjusting screws to enable achieving parallel planes between the bottom of the base, or foot block, and the plane of movement of the tool such as a router or cutter.

In a preferred embodiment, the attachment block has its holder so arranged and extending beyond the foot block so as to provide about 270° of visibility around the routing tool.

BRIEF DESCRIPTION OF DRAWINGS

FIG. 1 is a side elevational view of one embodiment of this invention.

FIG. 2 is an exploded isometric view of the embodiment of FIG. 1.

FIG. 3 is a partial end elevational view of the base block of FIG. 1.

FIG. 4 is a partial cross sectional view, taken along the line IV—IV of FIG. 1.

DESCRIPTION OF THE PREFERRED EMBODIMENTS

Referring now in detail to the drawings and particularly to FIGS. 1 and 2, the device 11 includes a motor in its housing 13, attached tool 15 and base 17. The base 17 includes a foot block 19, an attachment block 21, and adjusting means interconnecting the two blocks 19, 21 in such a way that a plane of a routing tool or the like can be aligned with a plane of the bottom of the foot block.

The foot block 19 has upwardly curving, arcuate sides 57 blending into a planar section, or bottom, 58, FIG. 3, to facilitate moving smoothly over a surface adjoining a section to be routed out or the like.

The foot block 19 has, as a part of the adjusting means, a slot 23, FIGS. 2 and 4 slidably receiving a connector bolt 25 and has a relatively wide holding area 27 for frictional engagement with the attachment block 21 when the connector bolt is screwed thereinto. As illustrated the connector bolt 25 has an Allen socket in the head for being rotated by an Allen wrench. Any desired shaped head can be employed on the connector bolt 25.

As illustrated, the foot block 19 has a flange 29 extending upwardly from its base at substantially 90°. The flange 29 contains the slot, connector bolt and wide frictional holding area 27. The wide holding area 27 is sufficiently larger than the slot 23 to allow slidable movement of the connector bolt 25 before tightening the attachment block into place. The wide holding area 27 has sufficient area to engage the mating surface of attachment block 21 regardless of where connector bolt 25 is moved in slot 23.

The foot block 19 has the flange 29 upstanding at one corner to form a nestling structure that facilitates gripping with a hand with fingers extending along the edge for guiding over an external surface, as of a wing surface.

The attachment block is cantilevered from the wide holding area at 90° so as to be substantially parallel with the base. The attachment block 21 has a cantilevered holder 31 and, as part of the adjusting means, a pair of threaded apertures 33 for adjusting screws. The apertures 33 are disposed on respective sides of the connector bolt 25 for pivotal movement to achieve alignment of the planes. Adjusting screws 35 penetrate through and threadedly engage the threaded apertures 33 with their respective bottom ends engaging the upper surface of the foot block for enabling aligning a plane of a router tool or the like with the plane of the bottom of the foot block. The screws 35 also have Allen sockets in their heads, although other sockets could be employed. If desired some freedom of movement of the connector bolt can be employed in conjunction with the pivotal movement for universal aligning of the planes.

The cantilevered holder extends longitudinally beyond the foot block so as to provide substantially 270° of visibility around the tool that will be held thereby. The cantilevered holder has a threaded aperture 37 for receiving a threaded male protrusion of a motor housing barrel. As illustrated, the cantilevered holder includes a 360° ring having the threads interiorly thereof.

In the illustrated embodiment a locking means comprising a lock ring 39 is provided for being tightened against the holder 31 so as to frictionally retain the threaded male protrusion 41 of the lower portion of the motor housing 43 in any attained depth position.

The tool 15 may comprise any suitable tool such as a honeycomb core cutter, an end mill cutter, or a fly cutter or the like. The tool is carried on a shaft. The shaft of the tool is affixed by suitable conventional means to the shaft that is powered by the motor within the housing 13. In the illustrated embodiment, the tool shaft is removably connected with the motor by way of a collet chuck.

The motor within the housing is conventional and may be an electric motor or a pneumatic or hydraulic motor within the housing 13. Such a motor, shaft and tools are conventional and need not be described in great detail herein. Preferably, the motor is a pneumatically powered motor with a centrally located high pressure air intake to facilitate rotation of the housing to attain a desired depth.

The housing 13 has a substantially cylindrical barrel 43 adjacent its bottom end with a threaded male protrusion 41 extending outwardly away from the motor. The male protrusion 41 threadedly engages the threaded aperture 37 of the cantilevered holder 31. A head depth indicator scale is formed about the substantially cylindrical barrel such that an indication is disposed adjacent an indicator 47. Specifically, the scale is marked off in indicia that are proportional to the pitch of the threads on the respective threaded section 37 and the threaded male protrusion 41 such that one complete rotation will effect a given penetration, or lowering in depth. For example, the indicia may be marked off in thousanths of an inch to obtain 0.050 inch for a particular number of degrees of rotation of the threaded section. For example, it has been found particularly satisfactory to employ threads having a pitch of 0.050 inch and mark the indicia such that one complete revolution of 360° around the barrel affords fifty thousanths inch penetration.

The indicator 47 is carried by the attachment block and stands perpendicularly therefrom with its upper end adjacent the barrel of the housing and the indicia thereon to facilitate a reference point for accurately obtaining a variety of depths of the tool. The indicator 47 may be affixed by any suitable means. Preferably the indicator 47 is rotatably and slidably mounted for flexibility in indicating easily remembered indicia. For example, in the illustrated preferred embodiment, the indicator 47 is slidably mounted in slot 48. Specifically, indicator 47 has a lower threaded end receiving nut 49 for tightening in an attained position. An upper nut 50 forms a base nut against which the lower nut 49 can be tightened. This structure allows the indicator 47 to be rotated, slid, or both, following loosening of nut 49, so as to move it to a desired indication mark circumferentially of the barrel 43 of the housing 13. There are a number of reasons why such circumferential movement may be desirable.

In operation, the motor 13 having a tool 15 and its shaft suitably connected so as to rotate in unison therewith is connected, as by way of pneumatic hose 51, with a source of air or the like. The motor 13 has a pneumatic switch 53 for turning on the motor. The motor has its male protrusion 41 screwed into the threads 37 of the holder 31. The lock ring 39 is tightened into place to hold a predetermined depth as indicated by the indicia on the barrel 43 adjacent the pointer 47.

A set up block (not shown) having a predetermined depth may be employed to calibrate the particular depth to which the tool is set below the bottom of the housing 13. Thus all tools are connected with a standard distance below the bottom of the housing 13 and facilitate attaining an accurate desired depth. The attachment block is attached to the upwardly extending flange 29 and tightened by tightening the connector bolt 25. This brings the wide frictional area 27 of foot block 19 together with its mating surface of attachment block 21 if the screws 35 are not too extended and attains an orientation perpendicular to the planar section 58. To complete parallel aligning of the plane of the tool 15 and plane of the bottom of foot block 19, the screws 35 are rotated to pivot about connector bolt 25. Thereafter, the desired depth for the particular routing is attained by rotating the motor housing 13 the suitable number of rotations.

If an aircraft wing is to have a section routed out, an Exato knife is employed to cut the honeycomb aluminum around the peripheral boundary of the area to be routed to the particular depth. Then the routing tool mounted on its base block and attachment block are moved so that the cutter cuts the aluminum honeycomb to the desired depth. The arcuately curved sides 57 of the base block allow the hand router to be hand moved over an irregular surface such as an aircraft wing without forming sharp breaks.

As indicated, while the tool 15 is shown as a cutter, it may be exchanged for any of the other tools desired to effect the given result.

Although the invention has been described with a certain degree of particularity, it is understood that the present disclosure is made only by way of example and that numerous changes in the details of construction and the combination and arrangement of parts may be resorted to without departing from the spirit and the scope of the invention, reference for the latter purpose being had to the appended claims.

It will be appreciated that slot 23 and the hole in block 21 for the bolt 25 can be sized to have sufficient clearance about the bolt, including its threaded end, to provide a slight up and down pivotal movement approximately about the interface of block 21 to the flange 29 in addition to the available pivoting of block 21 about the axis of bolt 25. Thus sized, the device provides two degrees of freedom of alignment, i.e., about two axes at 90° one to the other, allowing a universal type movement of base block to adjustment block for aligning the plane of the bottom of the tool to the plane of the bottom of the base block. Fine adjustment, up or down, of the tool with respect to base block is facilitated by the right angled pointed tip of the indicator which adjusts by the aforesaid turning or sliding of the indicator to point precisely at a desired adjacent indicia mark.

We claim:

1. A device for full depth hand routing of a structure, such as an aircraft wing, comprising:
   a. a foot block having a bottom and a top;
   b. an attachment block having a cantilevered holder; said cantilevered holder having a threaded aperture for receiving a tool motor housing barrel;
   c. adjusting means for connecting said attachment block with said foot block and for aligning a plane of a router tool with the plane of the bottom of said foot block;
   d. a routing tool carried on a shaft that is powered by a motor within a housing; said housing having a substantially cylindrical barrel adjacent its bottom end with a threaded male protrusion threadedly engaging said threaded aperture of said cantilevered holder and having an adjacent head depth indicator scale about the substantially cylindrical barrel such that an indication is disposed adjacent an indicator; and
   e. an indicator carried by said attachment block and upstanding substantially perpendicular therefrom with an upper end adjacent said head depth indicator scale to facilitate a reference point for accurately obtaining a variety of depths of said tool.

2. The device of claim 1 wherein said adjusting means comprises a slot in a portion of said foot block; a connector bolt penetrating through said slot and slidably removable therewithin when loosened; a wide frictional holding area for holding frictional engagement with a mating portion of said attachment block when said connector bolt is screwed thereinto, a threaded aperture in said attachment block for receiving said connector bolt; said connector bolt providing a pivotal axis; a pair of threaded apertures and threadedly engaging adjusting screws penetrating through said apertures with their respective bottom ends engaging the upper surface of said foot block and disposed on opposite sides of said connector bolt for enabling pivotal movement of said attachment block with respect to said foot block for aligning said planes of said router tool in said bottom of said foot block.

3. The device of claim 1 wherein said holder extends beyond said foot block so as to provide 270° of visibility around said tool.

4. The device of claim 3 wherein a locking means is provided for enabling maintaining an attained depth for said tool.

5. The device of claim 1 wherein said foot block has a base that includes a planar section with a flange upstanding from said base at substantially 90° with respect to said planar section; said flange having said slot and connector bolt and having said wide holding area at substantially 90° with respect to said planar section; said slot allowing said connector bolt to be slidably moved when loosened for positioning; said attachment block being cantilevered from said wide holding area at 90° so as to be parallel with said planar section of said base.

6. The device of claim 5 wherein said wide holding area is sufficiently larger than said slot to frictionally engage said mating surface on said attachment block when said connector bolt is screwed into the aperture in said attachment block, regardless of where said connector bolt is placed in said slot.

7. The device of claim 1 wherein said cantilevered holder includes a 360° ring having threads interiorly thereof and said locking means is a lock ring mounted on said threaded male protrusion section of said motor housing so as to be screwed against said ring for holding an attained position.

8. The device of claim 1 wherein said housing is an elongate housing, and said motor is a pneumatically operated motor with a centrally disposed air intake to facilitate rotating said housing in said holder to achieve a desired depth.

9. The device of claim 1 wherein said indicator is rotatably mounted on said attachment block.

10. The device of claim 1 wherein said indicator is slidably mounted in a slot in said attachment block so as to be repositionable circumferentially with respect to the base of said housing.

11. The device of claim 10 wherein said indicator is also rotatably mounted in said slot.

12. The device of claim 1 wherein said foot block has a flange upstanding therefrom at substantially 90° at one corner thereof and has a slot and a connector bolt penetrating said flange and holding said attachment block cantilevered therefrom so as to be parallel with the bottom of said base of said foot block having a bottom that has a planar section and arcuate upwardly extending sections such that said base block with said routing tool motor and indicator in place can nestle into one hand to facilitate gripping thereof.

13. The device of claim 12 wherein said slots 23 in said flange 29 and the hole in the block 21 for the bolt 25 are sized to have sufficient clearance about the bolt, including its threaded end which screws into said block 21, to provide a slight up or down pivotal movement approximately about the interface of block 21 to the flange 29 in addition to the available pivoting of the block 21 about the axis of the bolt 25 such that two degrees of freedom of alignment about two axes at ninety degrees one to the other allow universal type movement of the base block to the adjustment block for aligning the plane of the bottom of the tool to the plane of the bottom of the base block.

* * * * *